(12) United States Patent
Leung

(10) Patent No.: US 8,548,168 B2
(45) Date of Patent: Oct. 1, 2013

(54) SECURITY MODULE FOR SECURING AN ENCRYPTED SIGNAL WITH SYSTEM AND METHOD FOR USE THEREWITH

(75) Inventor: Lewis Leung, Markham (CA)

(73) Assignee: ViXS Systems, Inc., Toronto (CA)

( * ) Notice: Subject to any disclaimer, the term of this patent is extended or adjusted under 35 U.S.C. 154(b) by 1355 days.

(21) Appl. No.: 11/864,617

(22) Filed: Sep. 28, 2007

(65) Prior Publication Data

US 2009/0022315 A1    Jan. 22, 2009

Related U.S. Application Data

(60) Provisional application No. 60/950,850, filed on Jul. 19, 2007.

(51) Int. Cl.
*H04K 1/00* (2006.01)
(52) U.S. Cl.
USPC ............................. 380/255; 380/28; 380/239
(58) Field of Classification Search
USPC ........................................... 380/28, 255, 239
See application file for complete search history.

(56) References Cited

U.S. PATENT DOCUMENTS

| 7,681,241 B2 * | 3/2010 | Cox ................................. 726/27 |
| 2005/0108769 A1 * | 5/2005 | Arnold et al. .................. 725/115 |
| 2007/0274520 A1 * | 11/2007 | Ogata ........................... 380/201 |
| 2008/0148041 A1 * | 6/2008 | Carlson et al. ................ 713/151 |

\* cited by examiner

*Primary Examiner* — Farid Homayounmehr
*Assistant Examiner* — Suman Debnath
(74) *Attorney, Agent, or Firm* — Garlick & Markison; Bruce E. Stuckman

(57) ABSTRACT

A security module includes a signal interface for receiving an encrypted signal and a host interface that is coupleable to a host. A processing module is operable to receive encrypted decryption code from the host via the host interface, decrypt the encrypted decryption code to form decrypted decryption code that is operable to decrypt the encrypted signal, send the decrypted decryption code to the host via the host interface, monitor the security of the decrypted decryption code via security signaling sent between the host and the security module via the host interface to detect potential tampering with the decrypted decryption code, transfer the encrypted signal to the host via the host interface, and discontinue transfer of the encrypted signal when the security signaling indicates the potential tampering with the decrypted decryption code.

22 Claims, 10 Drawing Sheets

SECURITY MODULE FOR SECURING AN ENCRYPTED SIGNAL WITH SYSTEM AND METHOD FOR USE THEREWITH

CROSS REFERENCE TO RELATED PATENTS

The present application claims priority under 35 U.S.C. §119(e) from the provisional U.S. patent application Ser. No. 60/950,850 filed on Jul. 19, 2007, entitled, "Secure Hardware Encode and Decode" the contents of which is incorporated herein by reference thereto.

TECHNICAL FIELD OF THE INVENTION

The present invention relates to secure decryption of encrypted signals such as audio and video streams or other secure content.

DESCRIPTION OF RELATED ART

With the number of households having multiple television sets increasing, and many users wanting the latest and greatest video viewing services; as such, many households have multiple satellite receivers, cable set-top boxes, modems, et cetera. For in-home Internet access, each computer or Internet device has its own Internet connection. As such, each computer or Internet device includes a modem.

As an alternative, an in-home wireless local area network may be used to provide Internet access and to communicate multimedia information to multiple devices within the home. In such an in-home local area network, each computer or Internet device includes a network card to access a server. The server provides the coupling to the Internet. The in-home wireless local area network (WLAN) can also be used to facilitate an in-home computer network that couples a plurality of computers with one or more printers or facsimile machines, as well as to multimedia content from a digital video recorder, set-top box, broadband video system, etc.

Signals transmitted between devices can be encrypted to provide secure access. Certain multimedia content, such as music compact disks (CDs), video cassettes and digital video disks (DVDs) are recorded with copy protection signals that are meant to prevent the multimedia content contained on these media from being copied. These copy protection mechanisms can provide challenges to the compression and encoding techniques used when this content is transmitted or stored. In many such circumstances, the copy protection must be disabled for transmission between devices when encryption is used to secure the content from unauthorized copying. In addition, WLAN signals can be encrypted to prevent unauthorized access to the WLAN and to prevent unauthorized access to program content and/or other information that is transmitted over the WLAN. Encrypted signals can also be used for other secure communication and secure access applications.

Further limitations and disadvantages of conventional and traditional approaches will become apparent to one of ordinary skill in the art through comparison of such systems with the present invention.

DETAILED DESCRIPTION OF THE INVENTION INCLUDING THE PRESENTLY PREFERRED EMBODIMENTS

Figure 1:
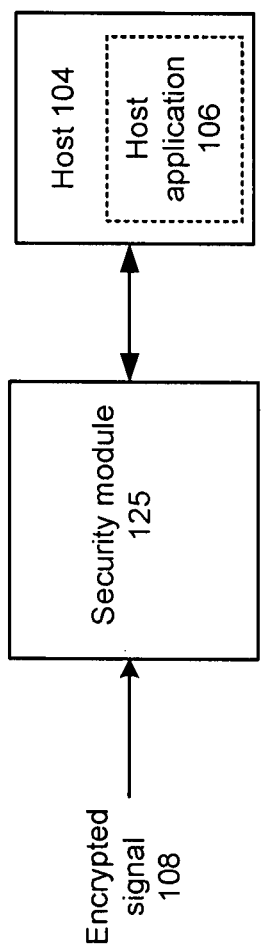
FIG. 1 presents a block diagram representation of a security module 125 and host module 104 in accordance with an embodiment of the present invention.

FIG. 1 presents a block diagram representation of a security module 125 and host module 104 in accordance with an embodiment of the present invention. In particular, a security module 125 operates in conjunction with host 104 to provide secure decryption of an encrypted signal 108 by host 104 so that a decrypted version of the encrypted signal 108 can be used by host application 106. The encrypted signal 108 can be a digital video stream, a digital audio stream, a digital multimedia signal, a communication signal or other encrypted data signal that originates from a LAN, WLAN, Internet gateway, or other network or network device or other device that is encrypted via a Rivest-Shamir-Adeleman (RSA) encryption algorithm, Diffie-Hellman encryption algorithm, or other encryption technique, either public key or otherwise.

Security module 125 monitors the operation of the decryption algorithm executed by host 104 to detect potential tampering. If potential tampering is detected, security module 125 interrupts the flow of encrypted signal 108 to host 104. In an embodiment of the present invention, security module 125 operates to insure that the decryption of the encryption signal is authenticated and operates only as authorized. Further details regarding security module 125 and host module 104, including several optional features and implementations, are presented in conjunction with the figures that follow.

Figure 2:
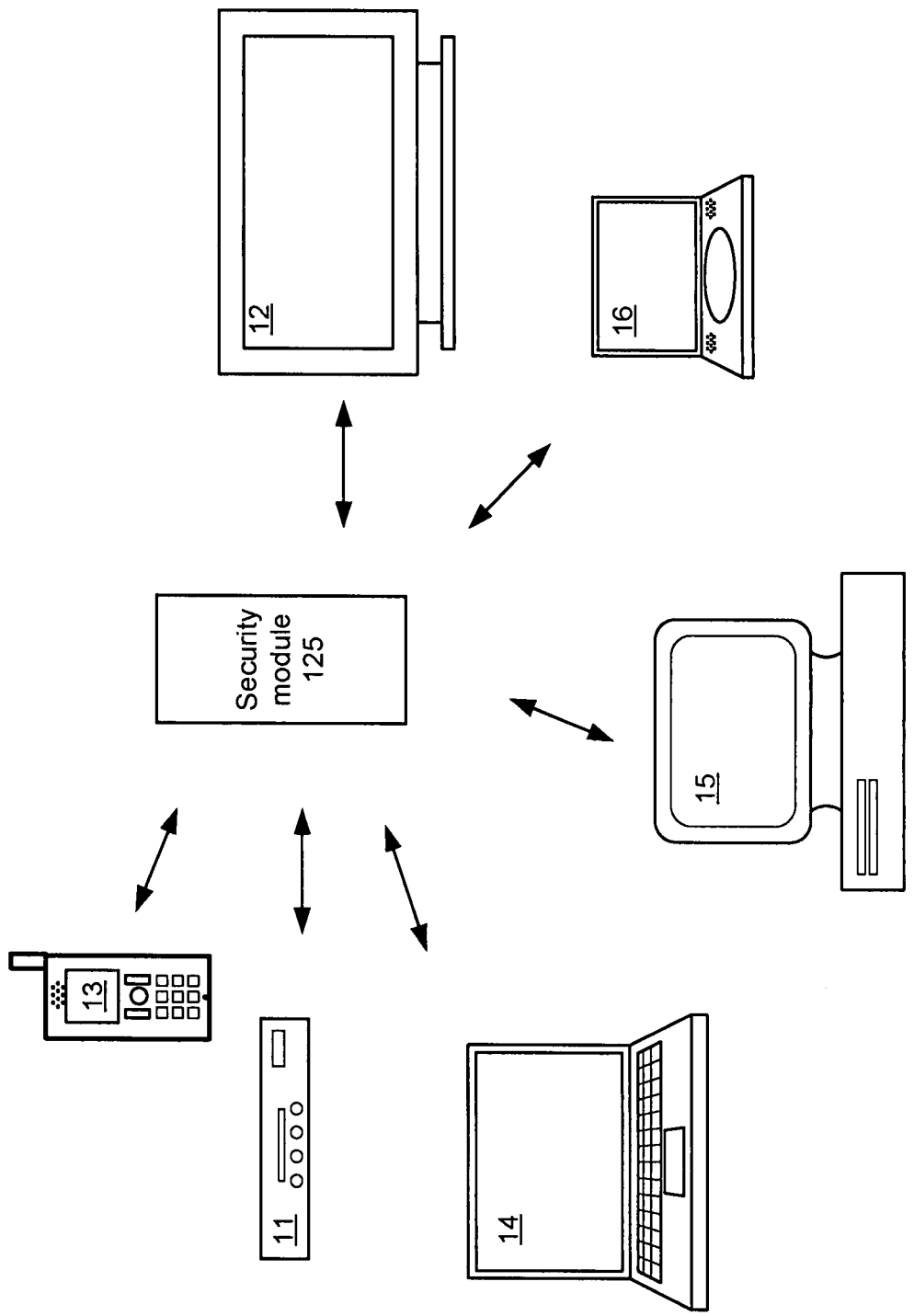
FIG. 2 presents a pictorial representation of example host devices 11-16 in accordance with an embodiment of the present invention.

FIG. 2 presents a pictorial representation of example host devices 11-16 in accordance with an embodiment of the present invention. In particular, examples of host device 104 include digital video recorder/set top box 11, television or monitor 12, wireless telephony device 13, computers 14 and 15, personal video player 16, or other host devices that process encrypted signals such as encrypted signal 108. Security module 125 is coupleable to one or more of these host devices via a host interface. Security module can take on any one of a number of form factors such as a PC card, memory card, personal computer memory card international association (PCMCIA) card, universal serial bus (USB) dongle or other device that is coupleable to one or more host devices via an Ethernet connection, a memory card interface, USB connection, Firewire (IEEE 1394) connection, small computer system interface (SCSI), PCMCIA interface, or other interface either standard or proprietary or that is incorporated into the host device.

Figure 3:
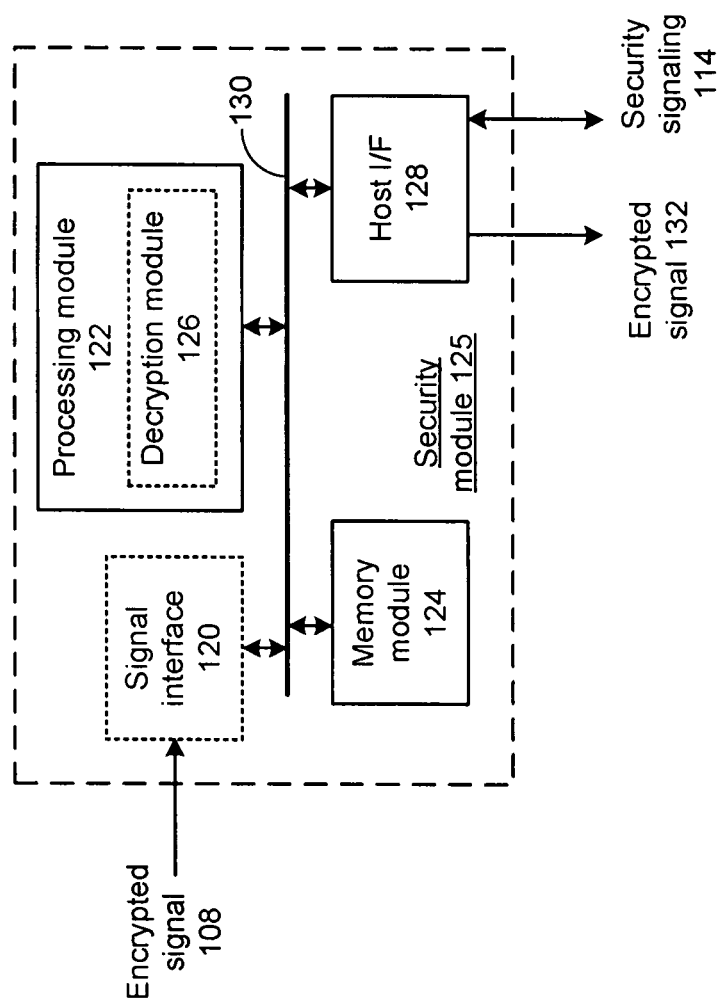
FIG. 3 presents a block diagram representation of a security module 125 in accordance with an embodiment of the present invention.

FIG. 3 presents a block diagram representation of a security module 125 in accordance with an embodiment of the present invention. In particular, security module 125 includes an optional signal interface 120 for receiving the encrypted signal 108, either wirelessly or via a wired connection. In various embodiments, optional signal interface 120 can include a wireless modem for receiving encrypted signal 108 using a wireless receiver via a WLAN, Bluetooth connection, infrared connection, wireless telephony receiver or other wireless data connection, or a wired modem or other network adaptor that uses a wired receiver or other device to receive the encrypted signal from a LAN, the Internet, cable network, telephone network or other network or from another device. Security module 125 further includes a host interface 128 for coupling to the host 104, a memory module 124 and a processing module 122 that is coupled to the signal interface 120, the host interface 128 and the memory module, such as via bus 130 that is shown. Host interface 128 couples to host 104, and formats and deformats signaling sent to and from host 104 in accordance with an Ethernet protocol, a memory card protocol, USB protocol, Firewire (IEEE 1394) protocol, SCSI protocol, PCMCIA protocol, or other protocol either standard or proprietary.

In operation, the host module 104 stores decryption code for decrypting the encrypted signal in accordance with the encryption method that was used to encrypt the encrypted signal 108. However, for security purposes, the decryption code stored in the host 104 is itself encrypted and the decryption code must itself be decrypted by the security module 125 prior to use.

In an embodiment of the present invention, the processing module 122 receives encrypted decryption code from the host 104 via the host interface 128, either by retrieving the decryption code or otherwise receiving data via the host interface 128 that includes the encrypted decryption code. Processing module 122 decrypts the encrypted decryption code, such as using the corresponding decryption key retrieved from memory module 124 or via other decryption algorithm using software, firmware or an optional dedicated decryption module 126 that is incorporated in processing module 122 or coupled thereto, to form decrypted decryption code that is operable to decrypt the encrypted signal 108. Processing module 122 then sends the decrypted decryption code to the host 104 via the host interface 128.

In an embodiment of the present invention, the processing module 122 authenticates the encrypted decryption code received from the host 104, such as by comparing an authorization code included in the encrypted decrypted code (either encrypted or not encrypted) via a lookup table or algorithm, to proper authorization codes or to a specific authorization code that corresponds to the host 104. The processing module 122 sends the decrypted decryption code to the host 104, only if the received encrypted decryption code is authenticated.

Processing module 122 transfers the encrypted signal 108 to the host 104 via the host interface 128 as encrypted signal 132, that represents encrypted signal 108 optionally formatted in accordance with the host interface protocol, depending on the type of host interface, Ethernet, Firewire, USB, SCSI, etc. that is employed. Processing module 122 monitors the security of the decrypted decryption code via security signaling 114 sent between the host 104 and the security module 125 via the host interface 128 to detect potential tampering with the decrypted decryption code. In particular, processing module 122 discontinues transfer of the encrypted signal 132 if the security signaling 114 indicates the occurrence of potential tampering with the decrypted decryption code.

The processing module 122 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 124. Memory module 124 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is shown, alternative architectures using direct connectivity between one or more modules and/or additional buses can likewise be implemented in accordance with the present invention.

Figure 4:
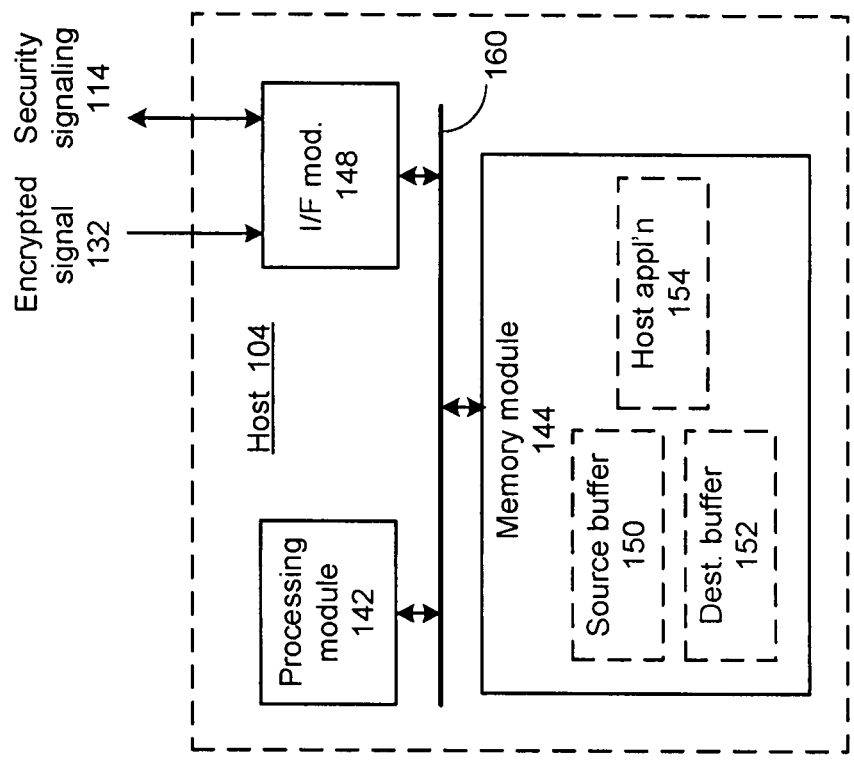
FIG. 4 presents a block diagram representation of a host 104 in accordance with a further embodiment of the present invention.

FIG. 4 presents a block diagram representation of a host 104 in accordance with a further embodiment of the present invention. Host 104 includes an interface module 148 that receives encrypted signal 132 and communicated security signaling 114 with the security module 125 in accordance with an Ethernet connection, a memory card interface, USB connection, Firewire (IEEE 1394) connection, SCSI connection, PCMCIA interface, or other interface either standard or proprietary. Host 104 includes a processing module 142 coupled to memory module 144 via bus 160. Processing module 142 executes at least one host application 154 that decrypts the encrypted signal 132.

Like processing module 122, processing module 142 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 144. Memory module 144 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is shown, alternative architectures using direct connectivity between one or more modules and/or additional buses can likewise be implemented in accordance with the present invention.

In an embodiment of the present invention, memory module 144 includes a 64 Kbyte source buffer 150 and a 68 Kbyte destination buffer 152, however, larger or smaller buffer sizes can be used, based on the length of the encrypted and decrypted encryption code and the size of the hashing code data, discussed below. While separate source and destination buffers are shown, a single buffer can likewise be used for this purpose. Processing module 122 of security module 125 can use direct memory access (DMA) commands to receive encrypted decryption code from the source buffer 150 or host 104 and to send the decrypted decryption code to the destination buffer 152.

In a mode of operation, the destination buffer 152 includes a portion to store the decrypted decryption code and a separate portion to store hashing code input and output data used to monitor the decryption code for tampering. It should be noted that the virtual addresses of these two portions of the destination buffer can be translated into physical addresses. In this fashion, the addresses corresponding to the destination buffer can be locked down by the security module 125 to prevent the contents of these buffers from being swapped out of the memory 144.

The processing module 122 generates hashing input data and sends this data via security signals 114 to destination buffer 152. In an embodiment of the present invention, DMA commands are used by processing module 122 to store the hashing code input data directly in a memory location of destination buffer 152 that has been reserved for this purpose. As processing module 144 of host 104 decrypts the encrypted signal 132, hashing code output data is generated by processing module 144 by processing the hashing code input data using a hashing algorithm, based on the decrypted decryption code. The hashing code output data is stored in another memory location of destination buffer 152 that has been reserved for this purpose. Processing module 122 retrieves the hashing code output data from destination buffer via further security signaling 114, such as via DMA commands, and compares the received hashing code output data to expected hashing code output data that is based on the hashing code input data previously provided. In this fashion, processing module can detect potential tampering with the decrypted decryption code when the received hashing code output data compares unfavorably to the expected hashing code output data, for instance, when the received hashing code output data does not match the expected hashing code output data. In response, the security module 125 can discontinue the transfer of encrypted signal 132 to host 104 either by discontinuing reception of the encrypted signal 108 or by not passing the encrypted signal 108 to host interface 128 for transfer to host 104.

In a further mode of operation the security module 125 generates updated hashing code input data and updated expected hashing code output data and sends the updated hashing code input data to the host 104 at regular intervals or irregular intervals, such as random intervals or pseudo random intervals. The processing module 122 then retrieves updated hashing code output data via security signaling 114, compares the received updated hashing code output data to the expected updated hashing code output data. As before, potential tampering can be detected when the received updated hashing code output data compares unfavorably to the expected updated hashing code output data. In addition, if the host 104 fails to update the hashing code output data within a programmed time frame, this failure can also be used to trigger a potential tampering fault and discontinue the transfer of encrypted signal 114.

Figure 5:
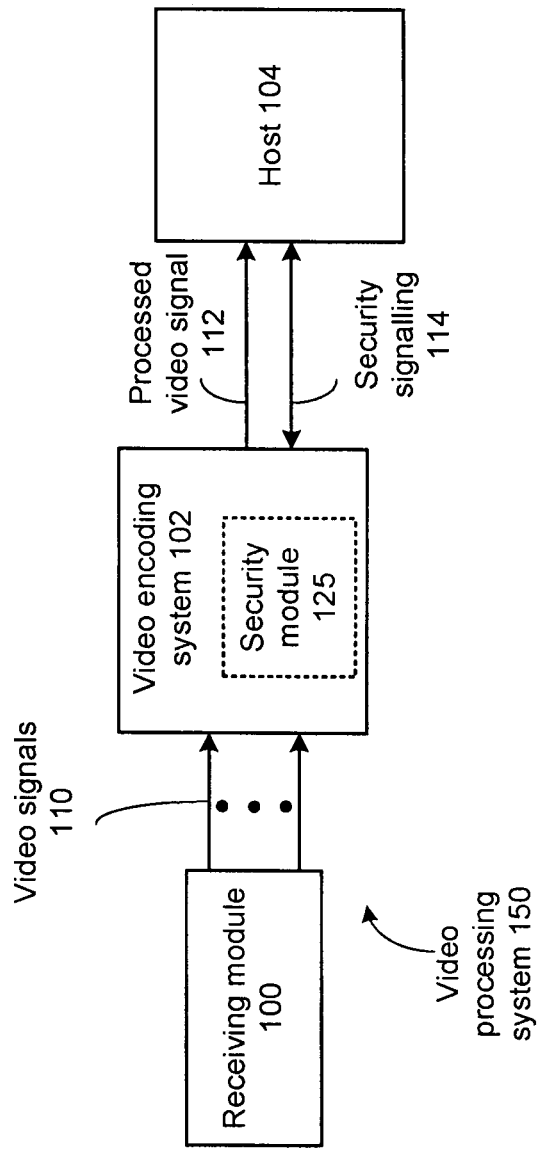
FIG. 5 presents a block diagram representation of a video processing system in accordance with a further embodiment of the present invention.

FIG. 5 presents a block diagram representation of a video processing system in accordance with a further embodiment of the present invention. In particular, video processing system 150 includes a receiving module 100, such as a set-top box, television receiver, personal computer, cable television receiver, satellite broadcast receiver, broadband modem, 3G transceiver or other information receiver or transceiver that is capable of receiving video signals 110, one or more of which can be an encrypted signal 108, from one or more sources such as a broadcast cable system, a broadcast satellite system, internet protocol (IP) TV system, the Internet, a digital video disc player, a digital video recorder, or other video source. Video encoding system 102 is coupled to the receiving module 100 to encode, transrate and/or transcode one or more of the video signals 110 to form processed video signal 112, such as encrypted signal 132. The video encoding system 102 includes security module 125 as previously described.

In an embodiment of the present invention, the video signals 110 can include a broadcast video signal, such as a television signal, high definition television signal, enhanced high definition television signal or other broadcast video signal that has been transmitted over a wireless medium, either directly or through one or more satellites or other relay stations or through a cable network, optical network or other transmission network. In addition, the video signals 110 can be generated from a stored video file, played back from a recording medium such as a magnetic tape, magnetic disk or optical disk, and can include a streaming video signal that is transmitted over a public or private network such as a local area network, wide area network, metropolitan area network or the Internet.

Video signal 110 can include an analog video signal that is formatted in any of a number of video formats including National Television Systems Committee (NTSC), Phase Alternating Line (PAL) or Sequentiel Couleur Avec Memoire (SECAM). Processed video signal includes 112 a digital video codec standard such as H.264, MPEG-4 Part 10 Advanced Video Coding (AVC) or other digital format such as a Moving Picture Experts Group (MPEG) format (such as MPEG1, MPEG2 or MPEG4), Quicktime format, Real Media format, Windows Media Video (WMV) or Audio Video Interleave (AVI), or another digital video format, either standard or proprietary.

Figure 6:
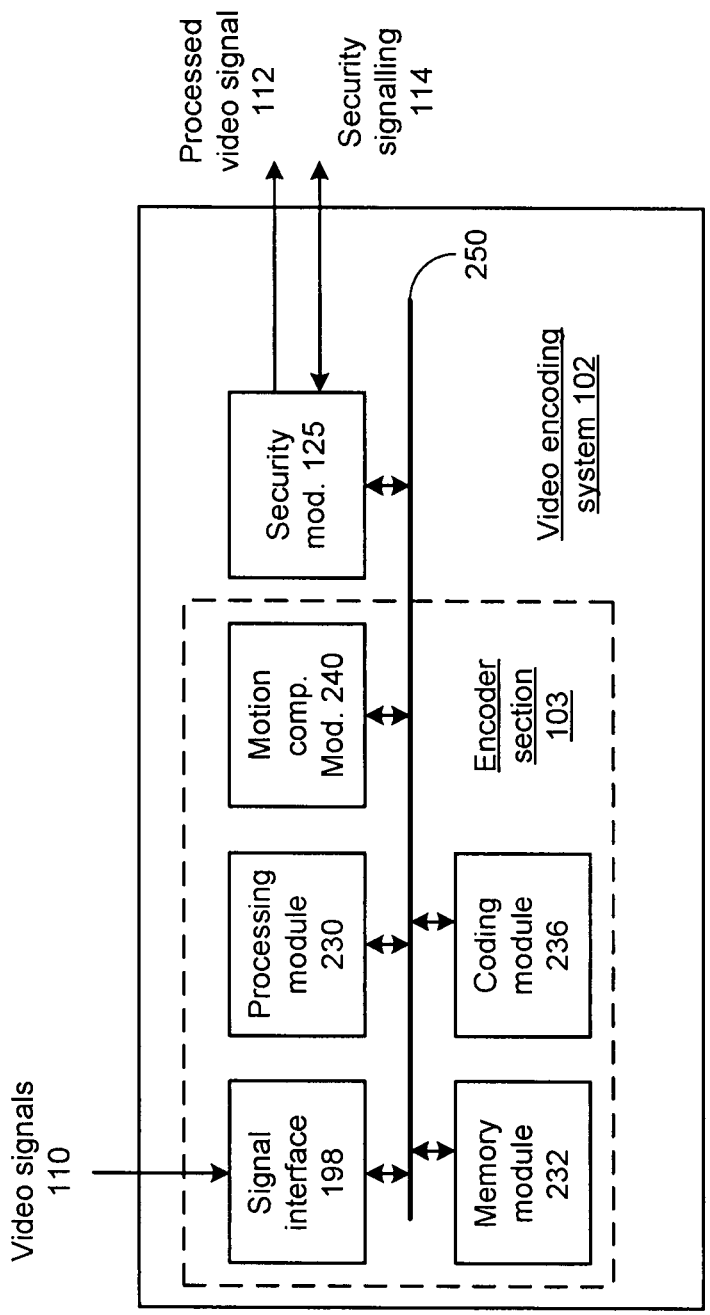
FIG. 6 presents a block diagram representation of a video encoding system 102 in accordance with an embodiment of the present invention.

FIG. 6 presents a block diagram representation of a video encoding system 102 in accordance with an embodiment of the present invention. In particular, video encoding system 102 operates in accordance with many of the functions and features of the H.264 standard, the MPEG-4 standard, VC-1 (SMPTE standard 421M) or other standard, to encode, transrate, transcale or transcode video input signals 110 that are received via a signal interface 198. In addition or in the alternative, video encoding system 102 operates to decrypt, and optionally encode, transcode, transrate, transcale the video signal 110 and then reencrypt the video signal to produce a processed video signal 112 that is transcypted and optionally transcoded, transcaled, transrated, into an altered format.

The video encoding system 102 includes an encoder section 103 having signal interface 198, processing module 230, motion compensation module 240, memory module 232, and coding module 236. The processing module 230 that can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 202. Memory module 232 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Processing module 230, and memory module 232 are coupled, via bus 250, to the signal interface 198 and a plurality of other modules, such as security module 125, motion compensation module 240 and coding module 236. The modules of video encoder 102 can be implemented in software, firmware or hardware, depending on the particular implementation of processing module 230. It should also be noted that the software implementations of the present invention can be stored on a tangible storage medium such as a magnetic or optical disk, read-only memory or random access memory and also be produced as an article of manufacture. While a particular bus architecture is shown, alternative architectures using direct connectivity between one or more modules and/or additional buses can likewise be implemented in accordance with the present invention.

In operation, motion compensation module 240 and coding module 236 operate to produce a compressed video stream based on either a video stream from one or more video signals 110. Motion compensation module 240 operates in a plurality of macroblocks of each frame or field of the video stream generating residual luma and/or chroma pixel values corresponding to the final motion vector for each macroblock. Coding module 236 generates processed video signal 112 by transforming coding and quantizing the residual pixel values into quantized transformed coefficients that can be further coded, such as by entropy coding in entropy coding, filtered by a de-blocking filter and/or encrypted and transmitted and/or stored as the processed video signal 112.

Figure 7:
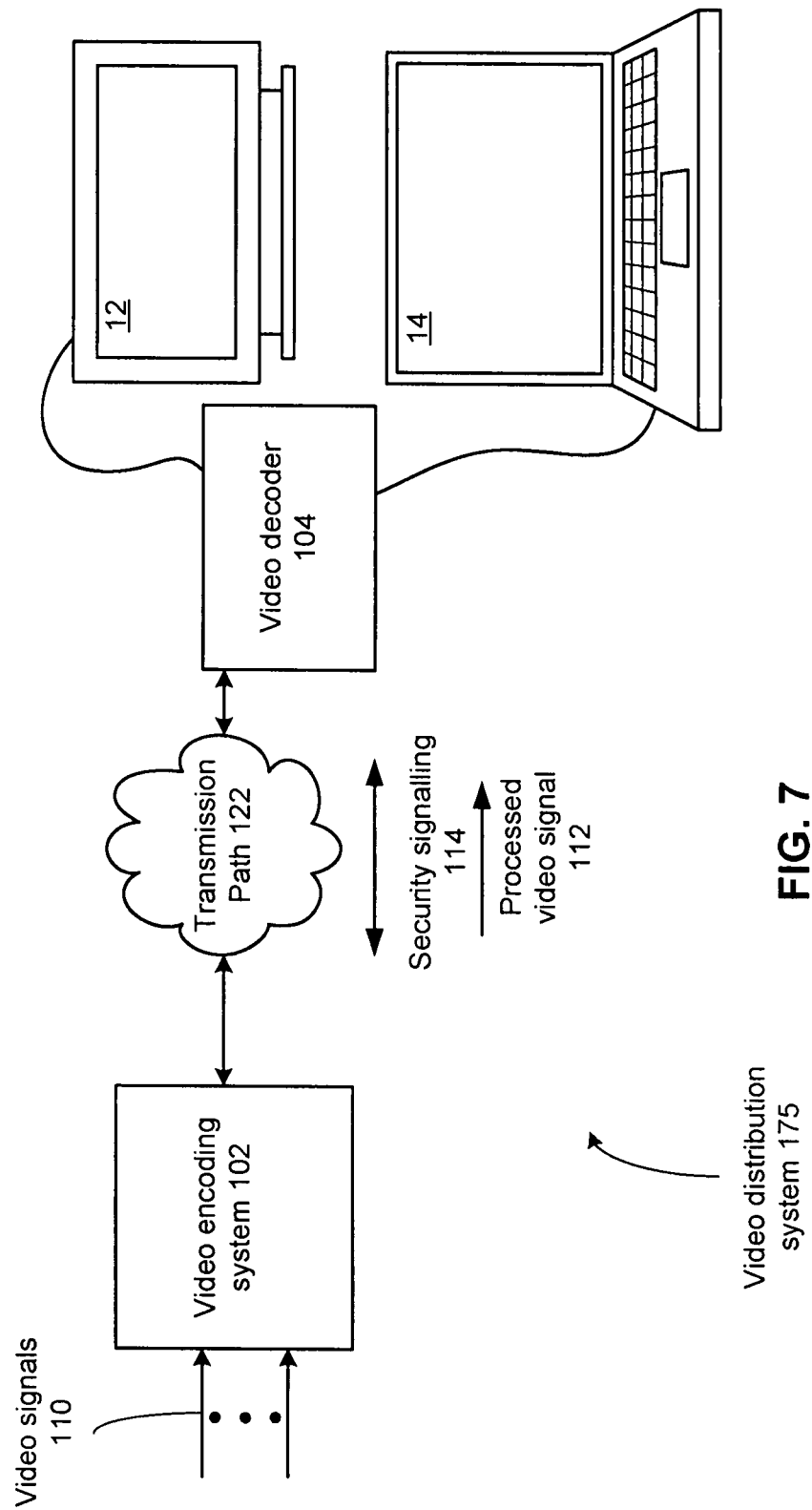
FIG. 7 presents a block diagram representation of a video distribution system 175 in accordance with an embodiment of the present invention.

FIG. 7 presents a block diagram representation of a video distribution system 175 in accordance with an embodiment of the present invention. In particular, processed video signal 112 is transmitted via a transmission path 122 to a video decoder 104. Video decoder 104, in turn can operate to decrypt and decode the processed video signal for display on a display device such as television 10, computer 20 or other display device.

The transmission path 122 can include a wireless path that operates in accordance with a wireless local area network protocol such as an 802.11 protocol, a WIMAX protocol, a Bluetooth protocol, etc. Further, the transmission path can include a wired path that operates in accordance with a wired protocol such as a USB protocol, high-definition multimedia interface (HDMI) protocol an Ethernet protocol or other high speed protocol.

Figure 8:
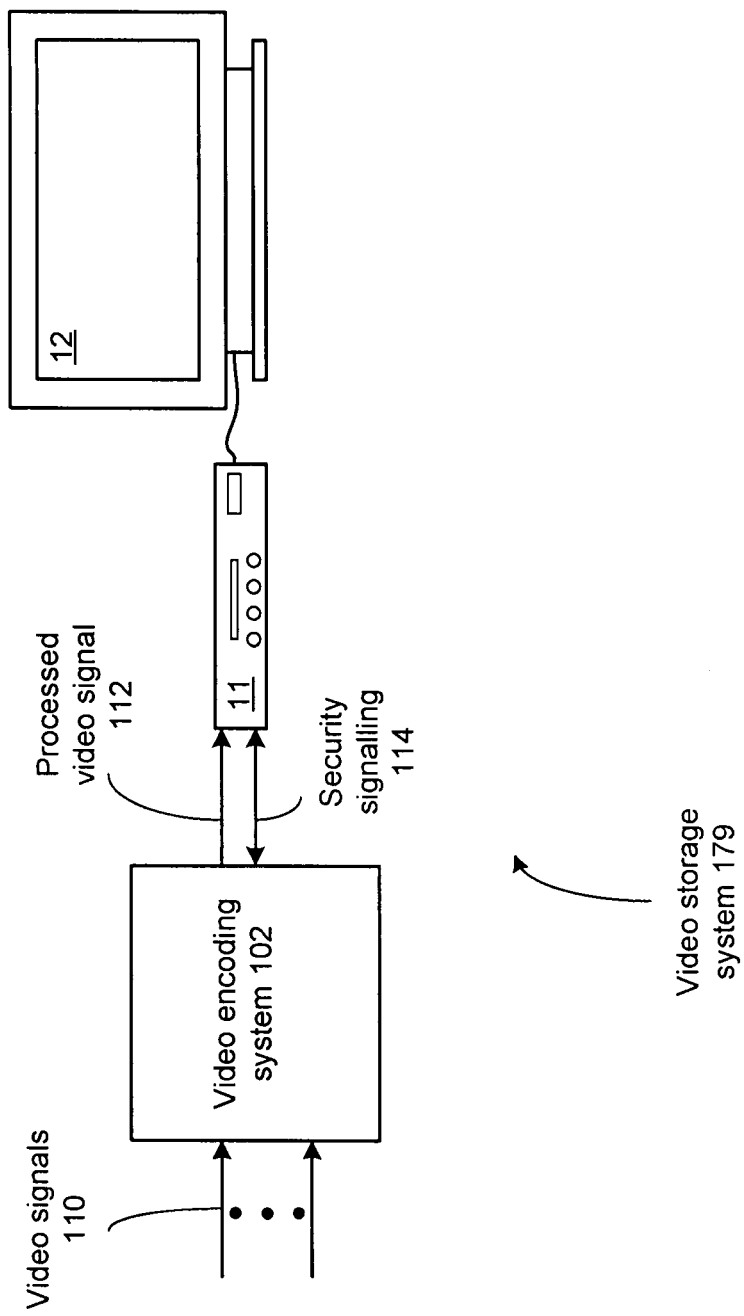
FIG. 8 presents a block diagram representation of a video storage system 179 in accordance with an embodiment of the present invention.

FIG. 8 presents a block diagram representation of a video storage system 179 in accordance with an embodiment of the present invention. In particular, device 11 is a set top box with built-in digital video recorder functionality, a stand alone digital video recorder, a DVD recorder/player or other device that decrypts and stores the processed video signal 112 for display on video display device such as television 12. While video encoder 102 is shown as a separate device, it can further be incorporated into device 11. While these particular devices are illustrated, video storage system 179 can include a hard drive, flash memory device, computer, DVD burner, or any other device that is capable of generating, storing, decoding and/or displaying the combined video stream 220 in accordance with the methods and systems described in conjunction with the features and functions of the present invention as described herein.

Figure 9:
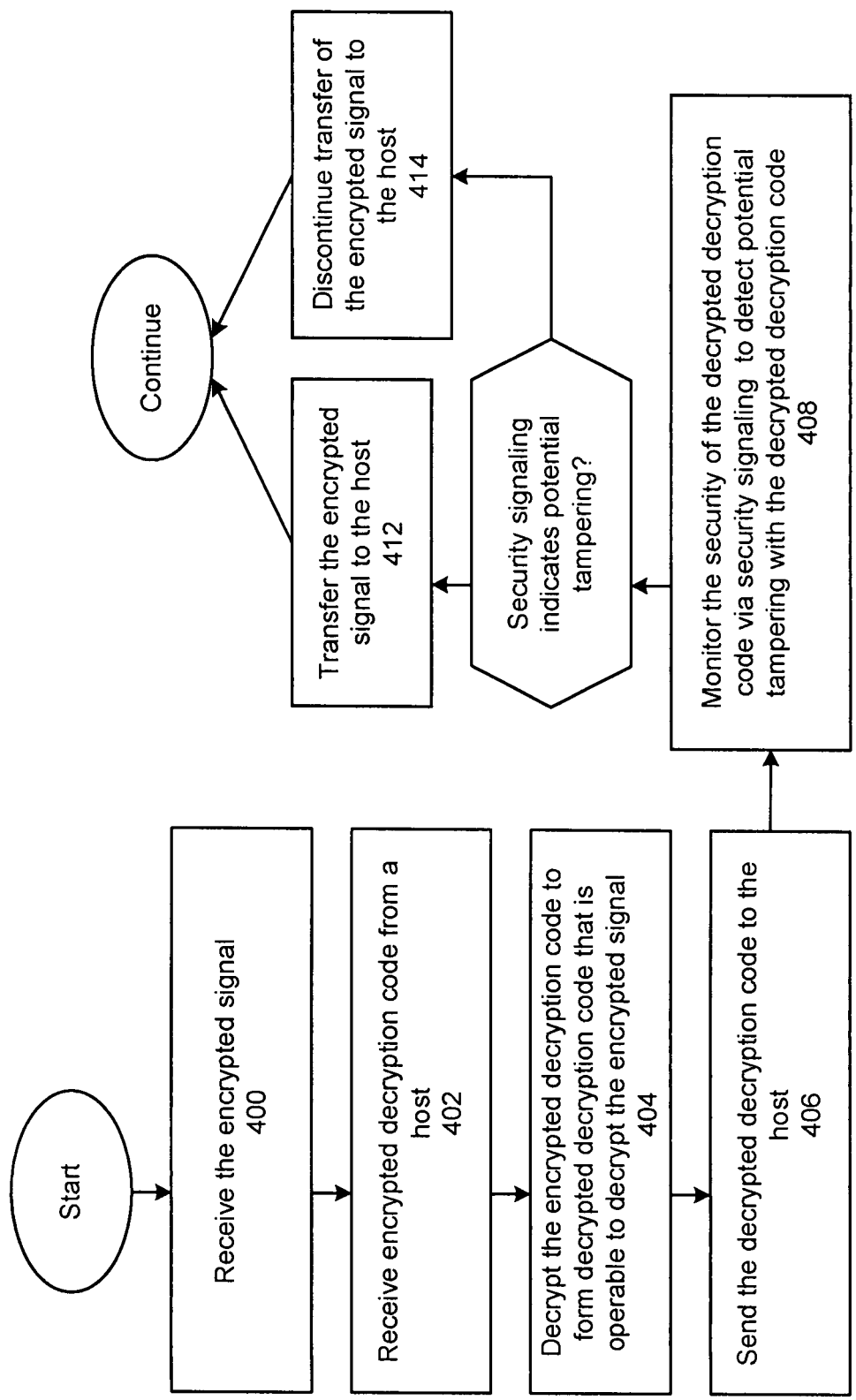
FIG. 9 presents a flowchart representation of a method in accordance with an embodiment of the present invention.

FIG. 9 presents a flowchart representation of a method in accordance with an embodiment of the present invention. In particular a method is presented for use in conjunction with one or more functions and features described in conjunction with FIGS. 1-8. In step 400, an encrypted signal is received. In step 402, encrypted decryption code is received from a host. In step 404, the encrypted decryption code is decrypted to form decrypted decryption code that is operable to decrypt the encrypted signal. In step 406, the decrypted decryption code is sent to the host. In step 408, the security of the decrypted decryption code is monitored via security signaling to detect potential tampering with the decrypted decryption code. When the security signaling does not indicate potential tampering, the encrypted signal is transferred to the host as shown in step 412. When the security signaling indicates potential tampering with the decrypted decryption code, the transfer of the encrypted signal is discontinued as shown in step 414.

In an embodiment of the present invention step 402 of receiving the encrypted decryption code from the host and step 406 of sending the decrypted decryption code to the host each use direct memory access commands. The security signaling can includes sending hashing code input data to the host and receiving hashing code output data from the host. Step 408 of monitoring of the security of the decrypted decryption code can include comparing the received hashing code output data to an expected hashing code output data and detecting potential tampering when the received hashing code output data compares unfavorably to the expected hashing code output data. In addition, step 408 can include sending updated hashing code input data to the host, wherein updated hashing code input data is sent to the host at either regular or irregular intervals and wherein the monitoring of the security of the decrypted decryption code includes receiving updated hashing code output data, comparing the received updated hashing code output data to an expected updated hashing code output data and detecting potential tampering when the received updated hashing code output data compares unfavorably to the expected updated hashing code output data.

The encrypted signal can a digital video stream, a digital audio stream, a digital multimedia signal, and/or a communication signal.

Figure 10:
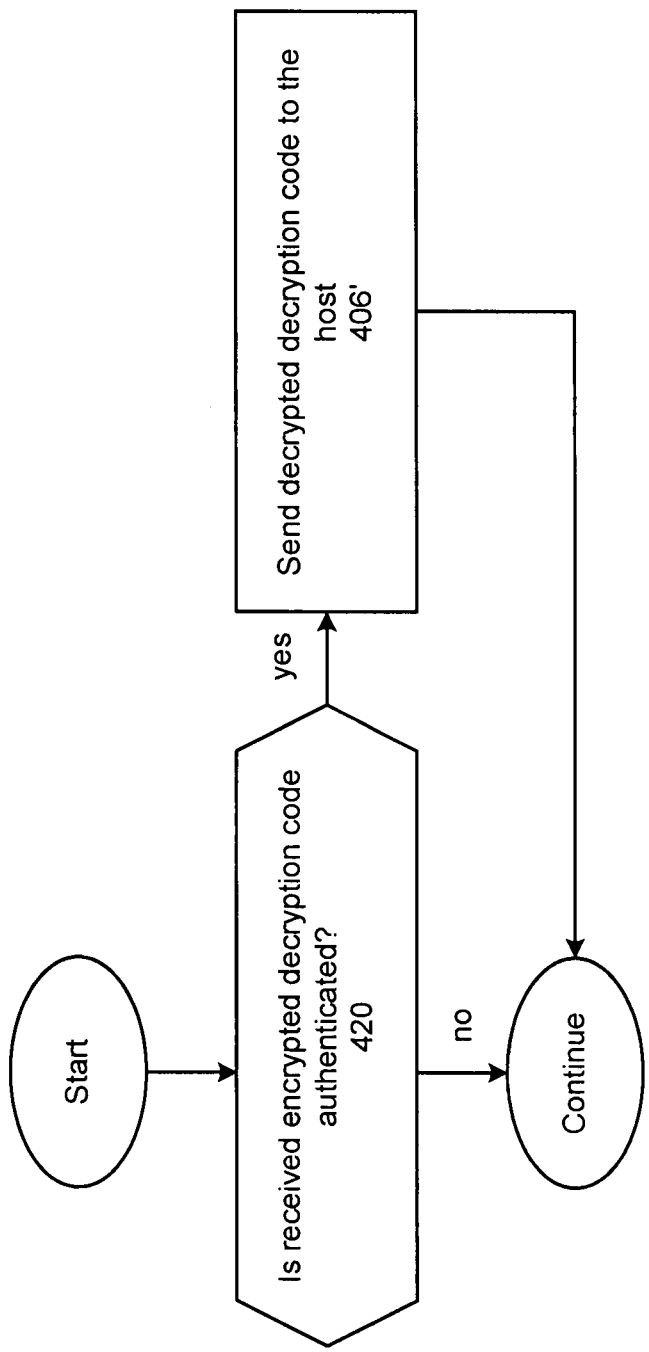
FIG. 10 presents a flowchart representation of a method in accordance with an embodiment of the present invention.

FIG. 10 presents a flowchart representation of a method in accordance with an embodiment of the present invention In particular a method is presented for use in conjunction with one or more functions and features described in conjunction with FIGS. 1-9. In step 420, the method attempts to authenticate the received encrypted decryption code. The decrypted decryption code is sent to the host only when the received encrypted decryption code is authenticated, as shown in step 406'.

In preferred embodiments, the various circuit components are implemented using 0.35 micron or smaller CMOS technology. Provided however that other circuit technologies, both integrated or non-integrated, may be used within the broad scope of the present invention.

While particular combinations of various functions and features of the present invention have been expressly described herein, other combinations of these features and functions are possible that are not limited by the particular examples disclosed herein are expressly incorporated in within the scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or more functions such as the processing of an input signal to produce an output signal. As used herein, a module may contain submodules that themselves are modules.

Thus, there has been described herein an apparatus and method, as well as several embodiments including a preferred embodiment, for implementing video processing and video storage systems and security module for use therewith and with other processing systems. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A security module for use in securing an encrypted signal, the security module comprising:
    a signal interface for receiving the encrypted signal;
    a host interface that is coupleable to a host;
    a memory module;
    a processing module, coupled to the signal interface, the host interface and the memory module, the processing module operable to:
        receive encrypted decryption code from the host via the host interface;
        decrypt the encrypted decryption code to form decrypted decryption code that is operable to decrypt the encrypted signal;
        send the decrypted decryption code to the host via the host interface;
        transfer the encrypted signal to the host via the host interface;
        monitor the security of the decrypted decryption code via security signaling generated by the host in response to the host's decryption of the encrypted signal and sent to the security module via the host interface during the transfer of the encrypted signal to the host to detect potential tampering with the decrypted decryption code wherein the security signaling includes sending hashing code input data to the host at intervals and wherein the monitoring of the security of the decrypted decryption code includes receiving updated hashing code output data from the host, comparing the received updated hashing code output data to an expected updated hashing code output data and detecting potential tampering when the received updated hashing code output data compares unfavorably to the expected updated hashing code output data; and
        discontinue transfer of the encrypted signal when the security signaling indicates the potential tampering with the decrypted decryption code.

2. The security module of claim 1 wherein the processing module uses direct memory access (DMA) commands to receive encrypted decryption code from the host and to send the decrypted decryption code to the host.

3. The security module of claim 1 wherein the monitoring of the security of the decrypted decryption code includes comparing the received hashing code output data to an expected hashing code output data and detecting potential tampering when the received hashing code output data compares unfavorably to the expected hashing code output data.

4. The security module of claim 1 wherein the monitoring of the security of the decrypted decryption code includes sending updated hashing code input data to the host.

5. The security module of claim 1 wherein the processing module is further operable to:
    authenticate the received encrypted decryption code; and
    send the decrypted data code to the host via the host interface only when the received encrypted decryption code is authenticated.

6. The security module of claim 1 wherein the encrypted signal includes one of, a digital video stream, a digital audio stream, a digital multimedia signal, a communication signal.

7. The security module of claim 1 wherein the signal interface includes one of, a wireless receiver, and a wired receiver.

8. The security module of claim 1 wherein the host interface operates in accordance with a PC card interface, a memory card interface, a universal serial bus interface, small computer system interface, a Firewire interface and an Ethernet interface.

9. A system for secure processing of an encrypted signal comprising:
    a host that executes a host application, the host having a source buffer and a destination buffer;
    a security module that includes:
        a signal interface for receiving the encrypted signal;
        a host interface that is coupled to the host;
        a memory module;
        a processing module, coupled to the signal interface, the host interface and the memory module, the processing module operable to:

receive encrypted decryption code from the source buffer via the host interface;

decrypt the encrypted decryption code to form decrypted decryption code that is operable to decrypt the encrypted signal;

send the decrypted decryption code to the destination buffer via the host interface;

transfer the encrypted signal to the host via the host interface;

monitor the security of the decrypted decryption code via security signaling generated by the host in response to the host's decryption of the encrypted signal to detect potential tampering with the decrypted decryption code, wherein the security signaling includes sending hashing code input data to the host at intervals and wherein the monitoring of the security of the decrypted decryption code includes receiving updated hashing code output data from the host, comparing the received updated hashing code output data to an expected updated hashing code output data and detecting potential tampering when the received updated hashing code output data compares unfavorably to the expected updated hashing code output data; and discontinue transfer of the encrypted signal when the security signaling indicates the potential tampering with the decrypted decryption code.

10. The system of claim 9 wherein the processing module uses direct memory access (DMA) commands to receive encrypted decryption code from the host and to send the decrypted decryption code to the host.

11. The system of claim 9 wherein the monitoring of the security of the decrypted decryption code includes comparing the received hashing code output data to an expected hashing code output data and detecting potential tampering when the received hashing code output data compares unfavorably to the expected hashing code output data.

12. The system of claim 9 wherein the monitoring of the security of the decrypted decryption code includes sending updated hashing code input data to the host.

13. The system of claim 9 wherein the processing module is further operable to:

authenticate the received encrypted decryption code; and send the decrypted decryption code to the host via the host interface only when the received encrypted decryption code is authenticated.

14. The system of claim 9 wherein the encrypted signal includes one of, a digital video stream, a digital audio stream, a digital multimedia signal, a communication signal.

15. The system of claim 9 wherein the signal interface includes one of, a wireless receiver, and a wired receiver.

16. The system of claim 9 wherein the host interface operates in accordance with a PC card interface, a memory card interface, a universal serial bus interface, small computer system interface, a Firewire interface and an Ethernet interface.

17. A method for use in securing an encrypted signal, the method comprising:

receiving the encrypted signal;

receiving encrypted decryption code from a host;

decrypting the encrypted decryption code to form decrypted decryption code that is operable to decrypt the encrypted signal;

sending the decrypted decryption code to the host;

transferring the encrypted signal to the host;

monitoring the security of the decrypted decryption code via security signaling generated by the host in response to the host's decryption of the encrypted signal to detect potential tampering with the decrypted decryption code, wherein the security signaling includes sending hashing code input data to the host at intervals and wherein the monitoring of the security of the decrypted decryption code includes receiving updated hashing code output data from the host, comparing the received updated hashing code output data to an expected updated hashing code output data and detecting potential tampering when the received updated hashing code output data compares unfavorably to the expected updated hashing code output data; and discontinuing the transfer of the encrypted signal when the security signaling indicates the potential tampering with the decrypted decryption code.

18. The method of claim 17 wherein receiving the encrypted decryption code from the host and sending the decrypted decryption code to the host include using direct memory access commands.

19. The method of claim 17 wherein the monitoring of the security of the decrypted decryption code includes comparing the received hashing code output data to an expected hashing code output data and detecting potential tampering when the received hashing code output data compares unfavorably to the expected hashing code output data.

20. The method of claim 17 wherein the monitoring of the security of the decrypted decryption code includes sending updated hashing code input data to the host.

21. The method of claim 17 further comprising:

authenticating the received encrypted decryption code; and sending the decrypted decryption code to the host only when the received encrypted decryption code is authenticated.

22. The method of claim 17 wherein the encrypted signal includes one of, a digital video stream, a digital audio stream, a digital multimedia signal, a communication signal.

* * * * *